United States Patent Office 3,385,811
Patented May 28, 1968

3,385,811
SULFUR-MODIFIED UNSATURATED BLOCK COPOLYESTERS
Joan Lesley Carrington and William Michael Corbett, Harrogate, England, assignors to Imperial Chemical Industries Limited, London, England, a corporation of Great Britain
No Drawing. Filed Dec. 1, 1965, Ser. No. 510,953
Claims priority, application Great Britain, Dec. 7, 1964, 49,715/64
8 Claims. (Cl. 260—29.6)

ABSTRACT OF THE DISCLOSURE

A block copolyester suitable for coating polyester fibers has been prepared by melt blending (1) sulfur free polyester homopolymer or copolymer comprising acids and glycols corresponding to those of the fiber to be coated e.g. polyethylene terephthalate with (2) an ethylenically unsaturated polyester. The resultant unsaturated block copolyester can be sulphonated by treating with sulphur dioxide, sulphurous acid or salts of sulphurous acid. The unsaturated block copolymer is applied to the fiber as an aqueous solution prior to sulphonation.

---

The present invention relates to a surface modifying treatment of shaped articles made from synthetic crystallisable polyesters.

Surface treatment of shaped articles made from essentially linear crystallisable polyesters with agents for modifying the properties of the articles, particularly antistatic agents, is well known. There are in general two ways in which such treatment has been carried out: either the agent is permanently attached to the surface by newly-formed covalent bonds, as in the case of radical grafting, certain isocyanate treatments, or base or acid catalysed treatments, or the agent is loosely held by polar or surface tension forces or other relatively low energy forces. Polyesters, because of their relatively non-polar nature, do not develop very high forces with agents for surface-treatment in this way, and consequently it has proved difficult to carry out a surface treatment of polyesters to obtain an effect which is permanent and resistant to washing, scouring, dry-cleaning etc. In the specification of our copending United Kingdom application No. 22,323/63 (F. 16844) is described a method for modifying the surface of articles derived from essentially linear crystallisable polyesters which provides a substantially permanent modification, very resistant to washing, scouring, dry cleaning, etc. which does not involve the formation of new covalent bonds with the existing surface of the article.

The method described involves the treatment of shaped polyester articles with a copolyester containing crystalline polyester segments which are identical with the repeat units constituting the crystalline segments of the shaped article and also segments containing active groups which modify the surface properties of the treated article. These active groups, which serve to modify the wetting and dyeing properties of the treated article, may be acidic groups or ionisable salts of acids, and may comprise p-sulphobenzoic ester groups, 5-sulpho-isophthalic ester groups, or poly(ethylene 5-sulpho-isophthalate).

Only relatively small amounts of these acidic groups can be introduced into a copolyester without difficulty, the addition of large amounts of esters of sulpho-dicarboxylic acids during the reaction of a dicarboxylic acid or its ester forming derivatives with a glycol followed by polymerisation leads to decomposition of the sulpho-dicarboxylic acid and subsequent deactivation of the catalysts used for ester-interchange and polymerisation. This results in the formation of polymers of very low molecular weight and of very poor colour. Furthermore, the addition of acids such as 5-sulphoisophthalic acid to a normal preparation of polyester leads to the formation of a random copolymer having a structure which may be represented by the formula

—ABAAABAABBAAAAAABA— wherein A is the repeat unit resulting from the major acidic monomer component of the ester-interchange mixture and B is a repeat unit resulting from the minor acidic monomer component. Such copolymers provide a less effective treatment for shaped articles than block copolymers having the orderly structure

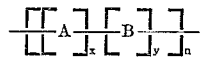

where $x$, $y$, and $n$ are integers greater than two.

We have now found a method of preparing copolymers containing a high proportion of blocks of sulphonic acid groups which, when applied to shaped polyester articles increase the wettability of the surface of the article, decrease the extent of soil redeposition during washing, and also facilitate the removal of soil during washing, the treatment being durable to prolonged washing.

Copolyesters containing sulphonate groups have frequently been described, in both the patent and scientific literature, but, those described, are random copolymers of high molecular weight and are usually fibre forming, of relatively low sulphur content, and have many properties essentially similar to those of the parent homopolymer. In contrast, the block copolyesters of this invention are of low molecular weight and are not fibre forming, are hydrophilic and readily dispersable in water, have a relatively high sulphur content and moisture absorption, and are block copolymers.

We therefore provide a copolymer characterised in that it contains at least 5% by weight of chemically bound sulphur in the form of sulphonic acid groups or sulphonate salts the said copolymer consisting of alternating blocks A and B, where blocks A are present in amounts between 20–50% by weight of the polyester and consist of sulphur-free dicarboxylic acid and glycol residues, and blocks B are present in amounts of between 80 and 50% by weight of the polyester and consists of essentially linear polyester chains containing sulphonated dicarboxylic acid and glycol residues.

We also provide a novel process for the preparation of block copolymers containing at least 5% by weight of chemically bound sulphur in the form of sulphonic acid groups or sulphonate salts comprising melt blending 20% to 50% by weight of a homopolyester of a sulphur-free dicarboxylic acid with 50% to 80% by weight of a homopolyester of an unsaturated dicarboxylic acid, followed by reacting the unsaturated groups of the resulting block copolymer with a compound selected from sulphur dioxide, sulphurous acid, and salts of sulphurous acid.

We also provide a process for treating a shaped article made from a synthetic crystalline polyester wherein the shaped article is heated whilst in intimate contact with a block copolyester, as hereinbefore defined, further characterised in that the sulphur-free blocks A of the copolyester have the same repeat units as those of the shaped article, the temperature of heating being above 60° C. and below the melting point of the shaped article.

Block copolymers containing a high proportion of sulphonic acid groups suitable for the treatment of shaped articles derived from poly(ethylene terephthalate) or copolymers of poly(ethylene terephthalate) containing a minor proportion of groups such as adipate, sebacate, isophthalate, sulphoisophthalate, oxydiethylene, p-oxyethoxybenzoate or p-oxybenzoate can be conveniently prepared by the addition of sulphurous acid or its salts to block copolymers consisting of poly(ethylene terephthalate) units which are identical with the basic repeat unit of the article to be treated, and polyalkylene ester units of an unsaturated dibasic acid.

Similarly, shaped articles of poly(tetramethylene terephthalate), poly(1,4 - bismethylenecyclohexane terephthalate), poly(ethylene naphthalene-2,6 - dicarboxylate), poly(ethylene diphenoxyethane-4,4'-dicarboxylate), and poly(ethylene oxybenzoate) as well as their copolymers may be treated with block copolymers having a high proportion of sulphonic acid groups, prepared from the appropriate unsaturated block copolymers which contain blocks of the respective repeat units to confer co-crystallisation.

The unsaturated homopolymer used for melt blending with the saturated homopolymer is prepared from unsaturated aliphatic acids in which the unsaturated bond is activated by the carboxylic groups. The unsaturated homopolymer may be prepared from dibasic unsaturated acids such as maleic acid, fumaric acid, itaconic acid, mesaconic acid, or citraconic acid or their ester forming derivatives, or from polybasic unsaturated acids such as aconitic acid or their ester forming derivatives with or without the addition of a dibasic acid or its ester forming derivatives. These acids or their ester forming derivatives are reacted with glycols such as ethylene glycol, tetramethylene glycol, or diethylene glycol to give the unsaturated homopolymer.

When the homopolymers are prepared in this manner they should not be of extremely high molecular weight, otherwise their melt blending and the addition of sulphur dioxide, sulphurous acid or its salts to the resulting block copolymer becomes difficult. We have found that a saturated homopolymer having a viscosity ratio up to 1.33 (determined in a 1% solution in o-chlorophenol at 25° C.) and an unsaturated homopolymer of viscosity ratio not greater than 1.2 (1% solution in o-chlorophenol at 25° C.) are very amenable to melt blending to give a block copolymer having a viscosity ratio not greater than 1.3. However, this does not mean that polymers having viscosity ratios greater than the above quoted figures cannot be employed in our invention. The melt blending process is best achieved by the addition of the unsaturated homopolymer to the stirred molten saturated homopolymer followed by continued stirring for a period of up to 15 minutes at a temperature of 200–250° C. Increasing the time and temperature of melt blending increases the probability of cross-linking the mixture to give a hard, cellular brown-black polymer of little value. The probability of cross-linking can be reduced by melt blending in the presence of an inert atmosphere such as nitrogen or by the addition of an antioxidant, particularly an antioxidant of the hindered phenol type such as bis(2-hydroxy-3-α-methylcyclohexyl-5 - methylphenyl)methane, 2,2-dimethyl-6-α-methylcyclohexylphenol, 2,6 - ditertiary-butyl-4-methylphenol, or bis(3-methyl - 6 - tertiarybutyl-phenol)-4,4'-sulphide. In general up to 5% by weight of the antioxidant on the weight of unsaturated homopolymer may be used, but preferably 0.2–2% by weight is added.

Sulphonation of the unsaturated block copolymer is readily achieved by treating with an aqueous solution of sulphurous acid or its soluble salts. Highly concentrated aqueous solutions up to saturation point are recommended. Particularly useful is sodium metabisulphite. The reaction is preferably performed at temperatures between 50° C. and 120° C., preferably near to 100° C. with stirring of the reaction products. This not only facilitates the reaction but also produces a sulphonated block copolymer having a particle size between 2–100 m$\mu$ and a viscosity of less than 250 centipoises. Using this procedure, stable aqueous dispersions of the sulphonated copolymer may be prepared containing up to 70% solids, the copolymers containing at least 5% by weight of chemically bound sulphur present as sulphonic acid.

The aqueous dispersions of this invention may be applied to shaped articles by any of the known techniques used for treatment of shaped articles. Preferably the aqueous copolymer dispersion is applied to the shaped article by padding or some other similar process, the water removed by evaporation, and then the shaped article heated at a temperature above 60° C., preferably 130–200° C., the time of heating being such that the copolymer co-crystallises with the shaped article. Times of heating from a few seconds to several minutes may be necessary, the actual time depending upon the rate of heat transfer from the source of heat to the treated fabric, and also upon the temperature used. The copolymer applied to the shaped article may range from 0.5 to 5.0% by weight of solid on the weight of shaped article, the preferred range being 1–3%.

Alternatively, the aqueous dispersion of copolymer may be applied by a conventional dyeing process at atmospheric pressure or pressures greater than atmospheric pressure with or without the use of a conventional dye carrier such as o-phenylphenol. This technique is particularly useful for the treatment of bulked fabric which cannot be heated at temperatures above 120° C. without impairment of their bulk properties. The copolymer content of the dyebath may range from 1–10% by weight of solids on the weight of the article, but 2–5% is the preferred range.

Although the preferred method of treatment is by the application of the sulphonated block copolymer to the shaped article, the unsaturated block copolymer may be applied to the shaped article which is then heated at a temperature preferably between 100–200° C. followed by heating for several hours in an aqueous solution of sulphurous acid or its salts.

Shaped articles, particularly fabrics, treated with the sulphonated copolymers of this invention are more readily wetted by water, suffer less soil redeposition, on washing, and facilitate soil removal during washing compared with untreated articles. Generally the treatment does not provide an antistatic effect, and consequently antistatic agents may be incorporated into the copolymers. Suitable antistatic agents include quaternary ammonium salts of an organic or inorganic acid and ethylene oxide condensates of alcohols, phenols, amines or amides. Incorporation may be made during any stage of preparation of the sulphonated block copolymer or the antistatic agent may be added to the aqueous dispersion prior to its application to shaped articles.

The beneficial properties of products of our invention extend to fabrics comprising blends of polyester fibres with other natural and synthetic fibres, e.g. blends of polyethylene terephthalate and cotton.

Articles treated with the copolymers of this invention are stable to prolonged exposure to heat and ultraviolet light in contrast to the copolymers containing poly(oxyethylene) groups described in our pending United Kingdom application 22,323/63, and therefore are suitable for application to articles designed for outside use or to prolonged exposure to light, for example curtains or furnishing material.

Shaped articles, particularly fabrics, may be simultaneously optically brightened and surface treated with the sulphonated copolymers of this invention. This may be achieved by incorporating an optical brightener at any stage during the preparation of the sulphonated block copolymer, or it may be added to the aqueous dispersion of the copolymer before application to the shaped articles. Suitable optical brighteners are those well-known to diffuse readily into the polyester article, and if the brightener is added during the preparation of the copolymer it must also be stable to the high temperatures used for the condensation reactions and melt blending. Optical brighteners suitable for addition to the copolymer dispersion include the following. Colour Index Fluorescent Brightening Agents 112, 134, and 135, "Uvitex EBF," "Tinopal ET," "Photine EB," "Fluolite XMF," and "Photine C33" (all Registered Trademarks). Optical brighteners suitable for incorporation into the copolymer during its preparation include stilbene derivatives such as 2-cyano-4-naphthatriazolyl-4'-chlorostilbene, benzoxazole derivatives such as 2,5-bis-(tertiary butyl-benzoxazol-2-yl)-thiophene, "Uvitex OKF" and "Uvitex 1980" (Registered Trademarks of Ciba Ltd.) and coumarin derivatives such as 3'-methylpyrazol-1'-yl-3-phenylcoumarin and "Leucopur EGM" (Registered Trademark of Sandoz).

In addition to optical brightening agents or antistatic agents, the aqueous copolymer dispersion may contain an antioxidant to reduce the extent of decomposition during the heating process, or to reduce the extent of loss of colour of the fabric.

We have found that a very effective treating composition for poly(ethylene terephthalate) shaped articles results from the addition of sodium metabisulphite to an unsaturated block copolymer prepared by melt blending 70 parts by weight of poly(ethylene maleate) with 30 parts by weight of poly(ethylene terephthalate).

The following examples, in which all parts and percentages are by weight, illustrate but do not limit our invention.

Example 1

This example illustrates the preparation of an unsaturated block copolymer containing maleate groups, its sulphonation, and application of the sulphonated copolymer by a pad-bake process to polyester fabric to make the surface hydrophilic.

40 parts of dimethyl terephthalate and 32.5 parts of ethylene glycol were heated together with 0.030 part of calcium acetate dihydrate to 230° C. until the theoretical amount of methanol was evolved. Then 0.0581 part of phosphorous acid followed by 0.016 part of antimony trioxide were added, excess of glycol removed at 283° C., and the reaction mixture heated at 283° C. under a vacuum of 0.1 mm. of mercury for 30 minutes.

To 12.4 pts. of ethylene glycol at 80° C. were added 23.34 pts. of maleic anhydride, and then the temperature of the mixture was raised to 150° C. over 1 hr. and finally to 190° C. in a further hour. Heating at 190° C. was continued for another hour whilst the pressure was reduced to 20 mm. of mercury.

24 pts. of the above poly(ethylene terephthalate) and 36 pts. of the poly(ethylene maleate) were heated at 283° C. under nitrogen for a total time of 5 mins. after melting. The cooled copolymer was ground and 15.2 pts. were heated with 11 pts. of sodium hydrogen sulphite as a 50% aqueous solution at 100° C. for 22 hrs. with vigorous stirring. The resulting mixture was dialysed against distilled water and then diluted to a 3.5% aqueous dispersion.

The dispersion was applied to optically brightened, warp knit poly(ethylene terephthalate) fabric at a 3.7% solids weight for weight level, baked at 200° C. for 5 mins. in an air-oven, and washed once in a washing machine under normal domestic conditions. The treated fabric was readily wetted by water as shown by the repulsion of oil stains by the fabric when immersed in water. Even after 50 machine washes in a household detergent or after exposure to ultraviolet light for 271 hours in a "Weather-Ometer" fitted with a xenon lamp and filters to simulate sunlight, the fabric was still readily wetted by water.

Example 2

This example illustrates the application of an unsaturated block copolymer containing maleate groups to polyester fabric by a pad-bake process, followed by sulphonation of the residual copolymer on the fabric. It also shows how washing in a soap solution rather than in a solution of detergent slowly deactivates the finish and how the finish can be re-activated by treatment with a salt solution.

Optically brightened poly(ethylene terephthalate) taffeta was padded with an aqueous dispersion of the poly(ethylene terephthalate-maleate) of Example 1 so that it retained 2.6% by weight of the copolymer, and then the fabric was baked at 200° C. for 5 mins. in an air-oven. It was then heated for 5 hrs. with a 50% aqueous solution of sodium hydrogen sulphite, washed once, and dried. A 7 by 1½ inch sample of the treated fabric had a resistance of $3.3 \times 10^5$ megohms whereas untreated fabric had a resistance of $6.0 \times 10^6$ megohms.

Again the treated sample was readily wetted by water as shown by the rapid removal of oil stains from its surface when the fabric was immersed in water. The wettability of the fabric decreased slowly on washing in a domestic soap powder, but even after 40 washes it was still better than untreated fabric. The loss in effectiveness after 40 washes was restored by heating the fabric with sodium chloride solution for 15 minutes at 60° C. followed by rinsing.

Example 3

Fabric containing 67% by weight of poly(ethylene terephthalate) fibres and 33% by weight of cotton fibres was treated with the copolymer of Example 11 using the conditions described in Example 18. The fabric even after prolonged washing with a household detergent suffered less soil redeposition on washing and facilitated soil removal than untreated fabric.

Example 4

This example illustrates the preparation of an unsaturated block copolymer containing citraconate groups, its sulphonation, and the application of the sulphonated copolymer to fabric by a pad-bake process.

To 8.3 parts of ethylene glycol at 80° C. were added 15 parts of citraconic anhydride. Gentle heat was applied to raise the temperature slowly to 190° C. when a vacuum of 20 mm. of mercury was applied for 10 minutes.

8 pts. of low molecular weight poly(ethylene terephthalate) prepared by the method described in Example 1 and 12 pts. of poly(ethylene citraconate) were melt blended together under nitrogen at 283° C. for 5 mins. from the time when the reactants were completely molten. 10 pts. of the finely divided, crystalline polymer were rapidly stirred with 40 pts. of a 50% aqueous solution of sodium hydrogen sulphite for 15 hrs. at 100° C. The reaction mixture was dialysed against water and then dispersed. Optically brightened poly(ethylene terephthalate) taffeta was padded with the dispersion, the fabric picking up 2.3% by weight of the copolymer. The fabric was baked at 200° C. for 5 mins. and then washed. It was readily wetted by water and had a resistance of $9.4 \times 10^5$ megohms whereas untreated fabric had a resistance greater than $6.0 \times 10^6$ megohms. The fabric was still readily wetted by water after 50 machine washes with a household detergent or after 352 hours exposure to U.V. light ("Weather-Ometer" exposure).

Example 5

Illustrated here is the application of an unsaturated block copolymer containing citraconate groups to polyester fabric by a pad-bake process and sulphonation of the residual copolymer on the fabric surface.

Poly(ethylene terephthalate) taffeta fabric was padded with a tetrachlorethane solution of poly(ethylene terephthalate-citraconate) prepared in Example 4 so that the fabric retained 5.7% by weight of the copolymer. The dried fabric was heated at 200° C. for 5 minutes in an air-oven and then washed once with a detergent. The fabric then retained 2.4% by weight of copolymer and was not readily wetted by water. However, after sulphonation of the residual copolymer by boiling the fabric for 6 hours in a 50% aqueous solution of sodium metabisulphite followed by washing once, the fabric was readily wetted by water.

Example 6

This example illustrates the preparation of an unsaturated block copolymer derived from itaconic acid, its sulphonation, and the application of the sulphonated copolymer to fabric by a pad-bake process. It also shows the use of an antioxidant in the preparation of the block copolymer.

A mixture of 26 pts. of itaconic acid, 12.4 pts. of ethylene glycol and 0.13 pts. of 2,4-dimethyl-6-α-methylcyclohexylphenol were heated together at 190° C. for 1 hr. under atmospheric pressure, and then for a further 20 mins. under a vacuum of 20 mm. of mercury.

To the hot unsaturated polyester was added 22.5 pts. of low molecular weight poly(ethylene terephthalate) prepared as in Example 1, and the mixture heated with stirring to 240° C., this temperature being maintained for 5 mins. The cooled block copolymer (25 pts.) was heated to 100° C. with rapid stirring with 50% aqueous sodium metabisulphite solution for 7 hrs. The cooled dispersion was dialysed against distilled water for 66 hrs., and then diluted to 500 parts by volume.

The dispersion was padded onto poly(ethylene terephthalate) taffeta fabric (3.0% copolymer pick-up) and the fabric baked at 200° C. for 5 minutes in an air-oven. After one wash the fabric retained 0.53% copolymer and the electrical resistance of a 7 x 1½ inch sample was $5.5 \times 10^5$ megohms (untreated fabric had a resistance greater than $6.0 \times 10^6$ megohms). It was readily wetted by water, even after 50 machine washes with a detergent or after 283 hrs. exposure to U.V. light in a "Weather-Ometer."

Example 7

This example illustrates the application of a block copolymer containing itaconate groups to polyester fabric by a pad-bake process followed by sulphonation of the residual copolymer.

Poly(ethylene terephthalate) taffeta fabric was padded with a tetrachlorethane solution of poly(ethylene terephthalate-itaconate) prepared as in Example 6 so that the fabric retained 5.5% by weight of the copolymer. The dried fabric was heated at 200° C. for 5 minutes in an air-oven and washed once with a detergent. The fabric then retained 5.1% by weight of copolymer and was not readily wetted by water. However, after sulphonation of the residual copolymer by boiling the fabric for 6 hr. in a 50% aqueous solution of sodium metabisulphite followed by washing once, the fabric was readily wetted by water.

Example 8

Illustrated here is the effect of varying the proportion of poly(ethylene terephthalate) from 50–80% by weight in the unsaturated block copolymer prior to sulphonation.

Example 1 was repeated except that the ratio of poly (ethylene terephthalate) to poly(ethylene maleate) was varied as indicated below. The treated samples were readily wetted by water.

| Poly(ethylene terephthalate) (proportion by weight) | Poly(ethylene maleate) (proportion by weight) | Resistance of treated fabric after one wash (megohms) |
|---|---|---|
| 1 | 1 | $3.0 \times 10^5$ |
| 2 | 1 | $1.5 \times 10^5$ |
| 4 | 1 | $2.0 \times 10^5$ |
| Untreated fabric | | $> 6.0 \times 10^6$ |

Example 9

In this example is shown how the treatment of polyester fabric with the sulphonated block copolymers facilitates soil removal.

Warp knit poly(ethylene terephthalate) fabric was padded with the dispersions of the sulphonated block copolymer described in Examples 1, 4, and 6, dried, and heated for 30 seconds at 200° C. on a pin stenter. The fabric was washed once, exposed for 1 week in the air intake of a ventilator system to soil, and then machine washed ten times, samples of the fabric being removed after each wash. The samples were then ranked in order of whiteness (see Table 1). It will be seen that one wash

TABLE 1.—EFFECT OF SULPHONATED COPOLYMERS ON EASE OF WASHING SOILED FABRIC

| Copolymer from— | Amount padded onto fabric (percent) | Decreasing Order of Whiteness ⟶ Number of Washes |
|---|---|---|
| Example 1 | 3.7 | 2 ......................... 1 ..................... |
| Example 4 | 2.3 | 2 ............... 1 ......................... |
| Example 6 | 3.0 | 4 ..... 3 ..... 2 ..... 1 ............ |
| Untreated fabric | | 10  9  8  7  6  5  4  3  2  1 | of the fabric treated with the copolymer described in Example 1 was equivalent to five washes of the untreated fabric. Fabric treated with the copolymers described in Examples 4 and 6 were also more easily washed clean than the control although the copolymer of Example 6 was not so effective as those of Examples 1 and 4.

Example 10 to 17

These examples illustrate the effect upon the properties of the sulphonated copolymers of (a) the nature of the unsaturated acid, (b) the percentage of poly(ethylene terephthalate), (c) the viscosity ratio of the poly(ethylene terephthalate), and (d) the time and temperature of melt blending. It also illustrates the use of an antioxidant during the melt blend stage.

Examples 1 and 6 were repeated except that the conditions were modified as described in Table 2 and also 1% by weight of 2,4 - dimethyl - 6 - α - methylcyclohexylphenol based on the weight of the polyethylene ester of the unsaturated acid was added at the melt blending stage. Table 2 also gives the properties of the sulphonated aqueous dispersions as prepared (i.e. without bead milling or similar treatment). The time and temperature of melt blending could not be increased far beyond those used without serious cross-linking of the resulting block copolymer. It will be seen from Table 2 that the concentrated dispersions of the sulphonated copolymers prepared from itaconic acid tended to separate on standing whereas those prepared from maleic acid were quite stable to prolonged standing. Variation of the viscosity ratio and proportion of the poly(ethylene terephthalate), and the time and temperature of melt blending over the range studied had only little effect upon the physical properties of the resulting dispersions of sulphonated copolymer.

The aqueous dispersions were dialysed against distilled water and then evaporated to dryness. The properties of the resulting solid sulphonated copolymers (Table 3) varied little with variation of composition etc.

TABLE 2.—EFFECT OF COMPOSITION AND TIME AND TEMPERATURE OF MELT BLENDING UPON DISPERSION PROPERTIES

| Ex. No. | Percent 2GT V.R.[1] 1.16 | Percent 2GT V.R.[1] 1.33 | Percent 2GM V.R. 1.15 | Percent 2GI V.R.[1] 1.07 | Melt blending Time (mins.) | Melt blending Temp., °C | Copolymer V.R.[1] | Copolymer M.P., °C | Dispersions as prepared Viscosity, cp. | Dispersions as prepared Particle size, μ | Dispersions as prepared pH | Dispersions as prepared Percent solids | Nature of solid | Percent weight increase at 65% RH | Percent S in solid |
|---|---|---|---|---|---|---|---|---|---|---|---|---|---|---|---|
| 10 | 7.3 | | 92.7 | | 5 | 230–232 | 1.09 | Sticks at 180 | 113 | 2 | 6 | 67 | Soft glass | 14.6 | 10.1 |
| 11 | | 31.6 | 68.4 | | 10.5 | 246 | 1.10 | Cross links, 220 | 160 | 5 | 7 | 41.2 | Glass | 6.8 | 8.7 |
| 12 | 51.5 | | 48.5 | | 5 | 260 | 1.31 | (Sticks 140), 220 | 60 | 4 | 4 | 31.2 | Crystalline | 5.5 | 6.7 |
| 13 | 28.6 | | | 71.4 | 6 | 225–234 | 1.12 | (Sticks <50), 150 | 80 | [2] 50 | 7 | 53.4 | do | 5.9 | 8.9 |
| 14 | | 49.5 | | 50.5 | 5 | 240 | 1.12 | (Sticks 170), 200 | 9 | [2] 50 | 7 | 41.1 | Highly crystalline | 11.7 | 6.1 |
| 15 | 10.0 | | | 90.0 | 5 | 238 | 1.11 | (Sticks 50), 90 | 23 | [2] 50 | 7 | 51.4 | Soft glass | 18.3 | 10.2 |
| 16 | | 9.6 | 90.4 | | 2 | 230–240 | 1.25 | (Sticks 70), 130 | 63 | 5–20 | 4 | 55.4 | do | 11.9 | 10.1 |
| 17 | 30.0 | | 70.0 | | 5 | 230–250 | 1.19 | (Sticks 140), 180 | 230 | 50–100 | 7 | 52.0 | Crystalline | 4.6 | 8.5 |

[1] 1% solution in orthochlorophenol at 25° C.
[2] Separates on standing.

2GT=Poly(ethylene terephthalate); 2GM=Poly(ethylene maleate); 2GI=Poly(ethylene itaconate).

TABLE 3.—EFFECT OF COMPOSITION AND TIME AND TEMPERATURE OF MELT BLENDING ON COPOLYMER PROPERTIES

| | Example No. | | | | | | | |
|---|---|---|---|---|---|---|---|---|
| | 10 | 11 | 12 | 13 | 14 | 15 | 16 | 17 |
| Unsaturated acid | Maleic | Maleic | Maleic | Itaconic | Itaconic | Itaconic | Maleic | Maleic |
| Percent Solids not dialysed | 39.2 | 52.5 | 50.1 | 46.5 | 29.2 | 34.1 | 32.9 | 54.3 |
| M.P. Solid (° C.) | 210–220 | 220 | 200 | 230 | 228–233 | 227 | 225 | 225 |
| V.R. solid (1% solution in DMSO[1] at 25° C.) | 1.10 | 1.22 | 1.16 | Insol. | Insol. | 2.17 | 1.12 | 1.16 |
| Percent Sulphur in solid | 8.8 | 6.9 | 4.9 | 5.0 | 5.1 | 6.9 | 8.6 | 7.6 |
| I.R. Spectrum | | | | Examples 10 to 17 showed no unsaturation | | | | |

[1] DMSO = Dimethylsulphoxide.

Example 18

In this example is illustrated the effect of composition of the sulphonated copolymer upon its effectiveness in facilitating soil removal and reducing soil redeposition.

The sulphonated copolymer of Examples 10 to 17 were padded onto poly(ethylene terephthalate) taffeta fabric at the 3% solids level, baked at 200° C. for 30 seconds on a pin stenter and then machine washed once. Part of the treated fabric was given 70 machine washes, samples being taken after every 10 washes. The hydrophilicity of the fabric was measured by the time taken for a film of mineral oil to leave the fabric surface when immersed in a 0.2% solution of household detergent maintained at 50° C. It will be seen from Table 4 that the treated fabric after 70 machine washes was still hydrophilic. Furthermore, the treated fabric after exposure to direct sunlight for 22 days still retained its hydrophilicity whereas fabric treated in a similar way with a polyethylene oxide block copolymer of our copending application 22,323/63 rapidly lost its hydrophilic properties.

Further portions of the treated fabric were soiled by passing through a chloroform solution of a graphite dispersion in mineral oil. The fabrics were dried, given one wash with a detergent using normal domestic conditions, and then their whiteness compared. The fabric treated with the various copolymers were all much whiter than untreated fabric similarly soiled and washed, but fabric treated with the copolymer of Example 11 was superior to the other treated samples of fabric (Table 4).

Samples of the treated fabric were also washed together in a 0.3% solution of household detergent in which had been dispersed a graphite dispersion in mineral oil. The untreated fabric after rinsing was badly soiled due to soil redeposition whereas all of the treated samples were much cleaner, only suffering very slightly from soil redeposition (Table 4).

TABLE 4

| Copolymer Example No. | Unsaturated acid | Oil test time (seconds) | | | | | | Visual order | | Oil test time (secs.), 22 days exposure |
|---|---|---|---|---|---|---|---|---|---|---|
| | | 1 Wash | 10 Washes | 20 Washes | 30 Washes | 50 Washes | 70 Washes | Soiling | Soil redeposition | |
| 10 | Maleic | 8 | 14 | 5 | 4.5 | 7 | 11 | 6 | Equally good | 7 |
| 11 | do | 10 | 11 | 7 | 6 | 9 | 13 | 1 | do | 11 |
| 12 | do | 14 | 13 | 6 | 6 | 8 | 8 | 4 | do | 9 |
| 13 | Itaconic | 17 | 12 | 6 | 6 | 10 | 7 | 7 | do | 8 |
| 14 | do | 20 | 16 | 6 | 7 | 8 | 11 | 8 | do | 10 |
| 15 | do | 9 | 11 | 7 | 5 | 7 | 9 | 5 | do | 8 |
| 16 | Maleic | 15 | 15 | 8 | 6 | 6 | 7 | 2 | do | 7 |
| 17 | do | 11 | 9 | 9 | 6 | 8 | 13 | 3 | do | 8 |
| Untreated fabric | | >30+ | >30+ | >30+ | >30+ | >30+ | >30+ | 9 | Badly soiled | |

Example 19

In this example is illustrated the effect of varying the temperature of baking the sulphonated copolymer on polyester fabric.

Poly(ethylene terephthalate) taffeta fabric was padded with 3% by weight of solids of the aqueous dispersion of the copolymer described in Example 11. The fabric was air dried and then baked on a pin stenter for 30 seconds at 130, 150, or 180° C. before being given 70 normal domestic machine washes. Samples of the fabric were taken after every 10 washes and the hydrophilicity of the surface measured by the oil test described in Example 18. It will be seen from Table 5 that baking at temperatures as low as 130° C.

TABLE 5.—EFFECT OF BAKING TEMPERATURE

| | Oil test (seconds) after washing | | | | | | Whiteness of washed soiled fabric |
|---|---|---|---|---|---|---|---|
| | 0 | 1 | 10 | 30 | 50 | 70 | |
| Temperature of baking, °C.: | | | | | | | |
| 130 | 3 | 7 | 7 | 8 | 9 | 8 | Good. |
| 150 | 4 | 8 | 6 | 8 | 8 | 9 | Do. |
| 180 | 2 | 5 | 5 | 6 | 7 | 8 | V. Good. |
| Untreated fabric | 30+ | 29 | 30+ | 30+ | 30+ | 30+ | Poor. | provided a wash durable, hydrophilic surface finish. The samples after 70 washes were artificially soiled as in Example 18 and then hand washed once in a detergent. All of the treated samples of fabric were whiter than the untreated fabric, again showing the wash stability of the treatment. However, the fabric baked at the highest temperature was the whitest and that baked at the lowest temperature was the dirtiest of those treated.

Example 20

This example illustrates the application of the sulphonated copolymer to polyester fabric by a dyeing technique.

Poly(ethylene terephthalate) fabric of a warp knit construction was "dyed" at 100° C. for 1 hour in a bath (40:1 liquor ratio) containing "Lissapol D" (Regd. trademark of I.C.I. Ltd.) 4% by weight on weight of fabric, 16% of diphenyl by weight on the weight of fabric, and 2% of the solid copolymer of Example 11 by weight on the weight of fabric. After "dyeing," the fabric was rinsed in water and dried. It was readily wetted by water as shown by the oil-test described in Example 18.

For a control, fabric was similarly treated but without the addition of the sulphonated copolymer. It was not readily wetted by water. Both the treated and the control fabric were given 70 machine washes, the treated fabric retaining its hydrophilic properties after this treatment. The two samples of fabric were artificially soiled as described in Example 18 and washed once. The treated fabric washed much cleaner than the control fabric. Even a further 50 machine washes of the latter fabric did not increase its whiteness to that of the former.

Example 21

In this example is described the application of the sulphonated copolymer to bulked polyester fabric by a dyeing technique.

"Crimplene" (Regd. Trademark of I.C.I. Ltd.) poly(ethylene terephthalate) bulked fabric was dyed with sulphonated copolymer as described in Example 20. After 50 machine washes the treated fabric was still hydrophilic. Samples of the once washed treated fabric and control were artificially soiled and washed once. Whereas the control fabric was dark grey, the treated fabric was almost white. The whiteness of the former even after a further 50 machine washes was not comparable with that of the latter after only one wash.

Example 22

This and the following example illustrate the combined surface treatment and optical brightening of fabric by the addition of an optical brightener to the copolymer dispersion prior to padding and baking.

Poly(ethylene terephthalate) taffeta fabric was padded with a dispersion of the copolymer described in Example 11 to which had been added a dispersion of the optical brightener "Uvitex" ERN (Regd. trademark of Ciba Ltd.), the concentrations of the combined dispersion being such that the fabric picked up on padding 3% by weight of copolymer solid and 1% of the optical brightener dispersion. The air dried fabric was baked in an air-oven for 5 minutees at 200° C. and then given 60 normal domestic machine washes using a detergent. After the washing the fabric still retained its hydrophilic surface and its high degree of whiteness.

Example 23

The above example was repeated except that Uvitex EBF (Regd. Trademark of Ciba Ltd.) was used as the optical brightener. The treatment gave a white fabric which was easily wetted by water, and these properties were maintained after 60 normal domestic machine washes with a detergent.

Example 24

This and the following example illustrate the simultaneous surface treatment of optical brightening of fabric by a dyeing technique, the optical brightener being added as a dispersion to the copolymer dispersion.

Poly(ethylene terephthalate) taffeta fabric was dyed at 100° C. for 1 hour in a bath (40:1 liquor ratio) containing o-phenylphenol (14% by weight on the weight of fabric), the copolymer of Example 11 (2% of solid copolymer on the weight of fabric), and Uvitex ERN (1% by weight on weight of fabric). It was then rinsed and dried. The resulting fabric was optically brightened and was readily wetted by water. After 60 normal machine washes with a detergent, the colour and hydrophilicity of the fabric were the same.

Example 25

The above example was repeated except that Uvitex EBG was used as the optical brightener. The resulting fabric, even after 60 normal domestic machine washes with a detergent, was of a very good white colour and was readily wetted by water.

Example 26

This example illustrates the addition of an optical brightener to the surface modifying copolymer during its preparation and the application of the modified copolymer to fabric by a pad and bake or dyeing procedure.

15 pts. of poly(ethylene terephthalate), 35 pts. of poly(ethylene maleate), both prepared as in Example 1, and 2.6 pts. of 2,5-(bistertiarybutylbenzoxazol-2-yl) thiophene were heated together with stirring at 240° C. under nitrogen for 5 minutes after the polymers had melted. The copolymer was cooled, and 49 pts. were heated with 49 pts. of a 50% aqueous solution of sodium metabisulphite for 18 hrs. at 100° C., rapid stirring being maintained throughout.

Poly(ethylene terephthalate) taffeta fabric was padded with the dispersion obtained above (3% solids pick up) and baked in an air-oven at 200° C. for 5 mins. This treatment resulted in an optically brightened fabric which gave a good oil test described in Example 18. After 50 domestic machine washes in a detergent, the colour and hydrophilicity of the treated fabric were still good.

A further sample of poly(ethylene terephthalate) taffeta fabric was "dyed" with the above copolymer dispersion using the conditions as described in Example 20. The treatment gave an optically brightened, hydrophilic fabric and the colour and hydrophilicity were still good after 50 domestic machine washes in a detergent.

Example 27

This example illustrates the preparation of a quaternary ammonium salt of a polysulphonate block copolymer, and its application to polyester fabric in order to modify the surface properties.

Poly(ethylene terephthalate-maleate) copolymer was prepared as described in Example 1 by melt blending 35 pts. of low molecular weight poly(ethylene terephthalate) and 15 pts. of poly(ethylene maleate) for 5 mins. at 230–240° C.

An aqueous solution (20 pts.) of 40% benzyltrimethylammonium hydroxide was saturated with sulphur dioxide and to it was added 5.7 pts. of the above unsaturated copolymer. The mixture was heated at 100° C. for 2½ hr. with rapid stirring whereby a dispersion of the quaternary ammonium salt of the sulphonated copolymer was obtained.

The dispersion of copolymer was padded (4.5% solids) onto poly(ethylene terephthalate) taffeta fabric and baked in an air-oven at 200° C. for 5 mins. After washing in a detergent, the fabric was readily wetted by water.

Further fabric was "dyed" with the copolymer dispersion by the method described in Example 20. After one wash in a detergent, the treated fabric was readily wetted by water.

Samples of fabric treated with the sulphonated copolymer by the pad and bake and the "dyeing" techniques were dyed with malachite green together with a sample of untreated fabric. After rinsing, the two treated fabrics had dyed to a deeper shade of green than the untreated, control fabric, showing that the surface modifying copolymer had increased the extent of dyeing by the malachite green.

Example 28

In this example is illustrated the addition of an antistatic agent to the sulphonated copolymer.

Several samples of sulphonated copolymer having the composition of that described in Example 11 were prepared except that N-stearyldiethanolamine was added at the melt blend stage so that its concentration in the final sulphonated copolymer was 1.0, 2.0, or 5.0% by weight. After sulphonation of the unsaturated block copolymer as previously described, the copolymers were "dyed" onto poly(ethylene terephthalate) taffeta fabric from a dyebath (40:1 liquor ratio) containing 14% by weight on the weight of fabric of o-phenylphenol, and 2% by weight on the weight of fabric of the above copolymers. After dyeing for 1 hr. at the boil, and rinsing, the fabrics were hydrophilic and failed to produce an electrostatic charge on rubbing against similar fabric. The lengthwise electrical resistance of 7 x 1½ inch strips of the fabrics measured at 20° C. and 65% relative humidity was $\log_{10}$ 5.022, 6.085, and 5.526, respectively, whereas that for untreated fabric was greater than $\log_{10}$ 7.0.

What we claim is:

1. A block copolyester containing at least 5% by weight of chemically bound sulfur in the form of sulfonic acid groups or sulfonate salts the said copolyester consisting of alternating blocks A and B, where blocks A are present in amounts between 20–50% by weight of the copolyester and consist of sulfur-free dicarboxylic acid and glycol residues selected from the group consisting of poly(ethylene terephthalate), poly(tetramethylene terephthalate), poly(1,4-bismethylenecyclohexane terephthalate), poly(ethylene naphthalene-2,6-dicarboxylate), poly(ethylene diphenoxyethane - 4,4' - dicarboxylate), and poly(ethylene oxybenzoate), and copolymers thereof, and blocks B are present in amounts of between 80 and 50% by weight of the copolyester and consist of essentially linear polyester chains containing sulfonated dicarboxylic acid and glycol residues, said copolyester being the product of a process comprising melt blending 20% to 50% by weight of a homopolyester of a sulfur-free dicarboxylic acid with 50% to 80% by weight of a homopolyester of an ethylenically unsaturated dicarboxylic acid, followed by reacting the unsaturated groups of the resulting block copolymer with a compound selected from sulfur dioxide, sulfurous acid, and salts of sulfurous acid.

2. A block copolyester according to claim 1 in which the sulphur-free block A are poly(ethylene terephthalate) blocks.

3. A block copolyester according to claim 1 in which the sulphonated dicarboxylic acid residues are selected from sulpho-succinic acid, methylsulphosuccinic acid, and sulphomethyl succinic acid residues.

4. Aqueous dispersions of block copolymers according to claim 1 having a particle size of less than 100 microns, a viscosity of less than 250 centipoises, and a solids content of 5 to 70% by weight of the weight of the dispersion.

5. An aqueous dispersion of a block copolymer as claimed in claim 4, wherein an optical brightener is present selected from 2-cyano-4-naphthatriazolyl-4'-chlorostilbene, 2,5-bis(tertiarybutyl-benzoxazol-2-yl)thiophene and 3'-methylpyrazol-1'-yl-3 phenylcoumarin.

6. Aqueous dispersions according to claim 4 wherein an antioxidant is present selected from bis(2-hydroxy-3-α-methylcyclohexyl-5-methylphenyl)-methane, 2,4-dimethyl-6-α-methycyclohexylphenol, 2,6-ditertiarybutyl-4-methylphenol, and bis(3 - methyl - 6 - tertiarybutylphenol - 4,4'-sulphide.

7. A shaped article of synthetic crystalline polyester treated by heating while in intimate contact with a block copolyester containing at least 5% by weight of chemically bound sulfur in the form of sulfonic acid groups or sulfonate salts the said copolyester consisting of alternating blocks A and B, where blocks A are present in amounts between 20–50% by weight of the copolyester and consist of sulfur-free dicarboxylic acid and glycol residues, and blocks B are present in amounts of between 80 and 50% by weight of the copolyester and consist of essentially linear polyester chains containing sulfonated dicarboxylic acid and glycol residues selected from the group consisting of poly(ethylene terephthalate) poly(tetramethylene terephthalate), poly(1,4 - bismethylenecyclohexane terephthalate), poly(ethylene naphthalene-2,6-dicarboxylate), poly(ethylene diphenoxyethane-4,4'-dicarboxylate), and poly(ethylene oxybenzoate), and copolymers thereof, said copolyester being the product of a procses comprising melt blending 20% to 50% by weight of a homopolyester of a sulfur-free dicarboxylic acid with 50% to 80% by weight of a homopolyester of an ethylenically unsaturated dicarboxylic acid, followed by reacting the unsaturated groups of the resulting block copolymer with a compound selected from sulfur dioxide, sulfurous acid, and salts of sulfurous acid, the sulfur-free blocks A of the copolyester having the same repeat units as those of the shaped article, the temperature of heating being above 60° C. and below the melting point of the shaped article.

8. A shaped article as set forth in claim 7 in which the synthetic crystalline polyester is polyethylene terephthalate.

References Cited

UNITED STATES PATENTS

| | | | |
|---|---|---|---|
| 2,403,533 | 8/1943 | Kaszuba | 95—9 |
| 2,454,546 | 11/1948 | Bock | 260—75 |
| 2,489,943 | 11/1949 | Wilson et al. | 260—75 |
| 2,901,451 | 8/1959 | Gagarine et al. | 260—29.2 |
| 3,194,678 | 7/1965 | Caldwell | 117—62.1 |
| 3,262,914 | 7/1966 | Goldberg et al. | 260—860 |
| 3,274,290 | 9/1966 | Goldberg et al. | 260—860 |
| 3,317,633 | 5/1967 | Tesoro et al. | 260—873 |

MURRAY TILLMAN, *Primary Examiner.*

J. T. GOOLKASIAN, *Assistant Examiner.*